United States Patent [19]
McHughs

[11] Patent Number: 6,131,960
[45] Date of Patent: Oct. 17, 2000

[54] PACKING SEALED EXPANSION JOINT

[76] Inventor: Larry McHughs, Rte. 1, Box 195A, Thebes, Ill. 62990

[21] Appl. No.: 09/174,174

[22] Filed: Oct. 16, 1998

[51] Int. Cl.⁷ .................................................... F16L 39/04
[52] U.S. Cl. ............................................................. 285/302
[58] Field of Search ..................................... 285/302, 298, 285/900

[56] References Cited

U.S. PATENT DOCUMENTS

| | | |
|---|---|---|
| 1,558,592 | 10/1925 | Chester ..................................... 285/302 |
| 2,308,757 | 1/1943 | Hulsberg ................................. 285/298 |
| 2,982,311 | 5/1961 | Haskell ................................... 285/302 |
| 3,642,094 | 2/1972 | Yancey . |
| 3,712,064 | 1/1973 | Kuhn . |
| 3,874,711 | 4/1975 | Scalzo et al. . |
| 3,951,418 | 4/1976 | Dryer ....................................... 285/302 |
| 3,984,131 | 10/1976 | Gingrich ................................. 285/302 |
| 4,054,158 | 10/1977 | Hoeman et al. . |
| 4,059,292 | 11/1977 | Skates . |
| 4,109,753 | 8/1978 | Lyman . |
| 4,189,926 | 2/1980 | Hsu . |
| 4,206,013 | 6/1980 | Dickey . |
| 4,246,959 | 1/1981 | Byrne . |
| 4,287,718 | 9/1981 | Dickey . |
| 4,299,414 | 11/1981 | Bachmann . |
| 4,403,796 | 9/1983 | Ledbetter et al. . |
| 4,581,882 | 4/1986 | Pallo et al. . |
| 4,644,747 | 2/1987 | Petersen . |
| 4,662,173 | 5/1987 | Wilkinson . |
| 4,734,248 | 3/1988 | Dunn ....................................... 285/302 |
| 4,776,617 | 10/1988 | Sato ........................................ 285/302 |
| 4,848,803 | 7/1989 | Bachmann . |
| 4,852,640 | 8/1989 | McKenna . |
| 4,869,064 | 9/1989 | Deutschmann . |
| 5,011,193 | 4/1991 | Porte ....................................... 285/302 |
| 5,094,492 | 3/1992 | Levivier ................................. 285/302 |
| 5,378,026 | 1/1995 | Ninacs et al. . |
| 5,480,194 | 1/1996 | Mantoan et al. . |
| 5,517,822 | 5/1996 | Haws et al. . |
| 5,542,715 | 8/1996 | Mantoan et al. . |
| 5,573,284 | 11/1996 | Boyer et al. . |
| 5,626,103 | 5/1997 | Haws et al. . |
| 5,653,474 | 8/1997 | Ninacs et al. . |
| 5,897,146 | 4/1999 | Saito ....................................... 285/302 |

Primary Examiner—Lynne H. Browne
Assistant Examiner—Aaron Dunwoody
Attorney, Agent, or Firm—Pillsbury Madison & Sutro LLP

[57] ABSTRACT

A fluid conduit expansion joint has a first tube section and a second tube section in which the inner diameter of the first tube section is greater than the outer diameter of the second tube section. A portion of the second tube section is slidably disposed within the first tube section, in a telescoping type arrangement. The first and second tube sections are held spaced apart by packing material which is arranged to form a fluid type seal between the first and second tube sections.

15 Claims, 3 Drawing Sheets

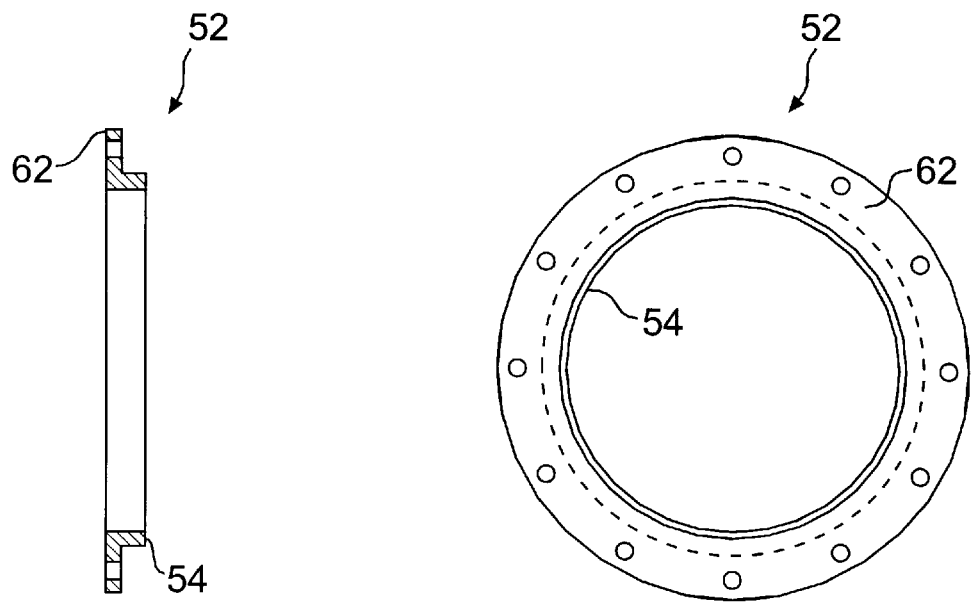
FIG. 5A  FIG. 5B
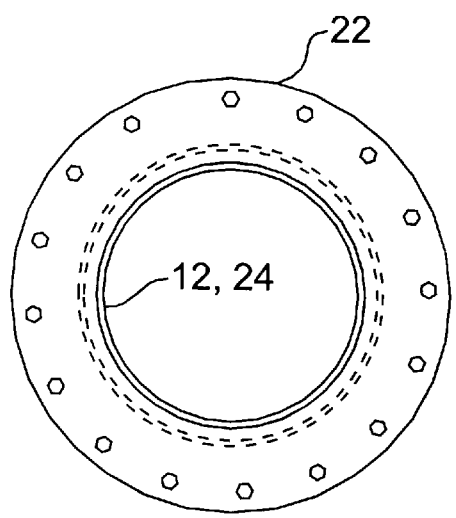
FIG. 6

PACKING SEALED EXPANSION JOINT

BACKGROUND OF THE INVENTION

1. Field of the Invention

The present invention pertains to a fluid conduit that has an expansion joint, and more particularly to a fluid conduit with an expansion joint having packing material between first and second tube sections.

2. Description of Related Art

Many materials expand as their temperature increases, and contract with decreasing temperatures. Generally, metals have large thermal expansion coefficients which indicate that they undergo a relatively large expansion for a given change in temperature. Consequently, the need for expansion joints has long been recognized.

There are a large variety of expansion joints known in the art. Many such conventional expansion joints may be classified as of the bellows type expansion joint. In such expansion joints, the material, which is often a metal, has a corrugated or bellows-like structure. As the temperature of the expansion joint changes, the bellows-like structure can expand and contract like a bellows, or in a spring-like manner. Such expansion joints have disadvantages that they result in fatigue and thus cracks and other damage to the joint. This is a particularly severe problem when the material is brittle, when there are frequent cycles of temperature changes, and with large temperature variations.

An expansion joint which has a bellows-like, or spring-like, structure is disclosed in Mutchler (U.S. Pat. No. 4,072,329). The device of Mutchler has the disadvantages of the bellows-type expansion joints in that its bellow-like, or spring-like, structure undergoes fatigue as the joint is cycled through temperature changes during operation. Furthermore, the device of Mutchler is designed to carry gases which are at relatively low temperatures such as 500° F.

SUMMARY OF THE INVENTION

Accordingly, it is an object of this invention to provide an expansion joint which is resilient to fatigue over extended periods of operation.

It is another object of this invention to provide an expansion joint which is resilient to fatigue under extended operation which includes high temperatures.

It is another object of this invention to provide an expansion joint which is easily repairable after sustaining wear due to extended operations.

It is another object of this invention to provide an expansion joint which dampens vibrations of the expansion joint and/or the fluid conduit to which it is connected.

It is another object of this invention to provide an expansion joint which facilitates the measurement of the quality of the seal of the expansion joint.

It is another object of this invention to provide an expansion joint for a fluid conduit which facilitates the measurement of physical properties of the fluids within the conduit.

It is another object of this invention to provide a fluid conduit that has an expansion joint constructed according to any of the above mentioned objects.

The above and related objects of this invention are realized by providing an expansion joint which has a first tube section with an inner diameter that is wider than an outer diameter of a second tube section. The first tube section defines an internal region which accommodates a portion of the second tube section. The portion of the second tube section disposed within the inner region of the first tube section is held spaced apart from the first tube section by packing material arranged in the region between the first and second tube sections. Preferably, the packing material is confined into two annular rings, otherwise known as packing glands. However, the scope of the invention is not limited to only arranging packing material in two annular rings. One skilled in the art would readily recognize from the teachings of the specification that many modifications of the arrangement of the packing material are included within the scope and spirit of this invention.

In the preferred embodiment, one packing gland is defined proximate to an end of the second tube section, and another packing gland is defined proximate to the end of the first tube section. The packing gland proximate to the end of the second tube section is defined on two opposing ends by retainer rings which are proximate to the end of the second tube section, but spaced apart. Preferably, the packing material is wider in the radial direction towards the first tube section than the retainer rings which define the packing gland. The packing material thus prevents the first tube section and the second tube section, including the retainer rings, from coming into direct contact with each other. Preferably, there is little or no direct contact between the first tube section and the second tube section, including the retainer rings, even while the fluid conduit and expansion joint are vibrating under operation conditions.

The second packing gland is defined on one end by a retainer ring and on an opposing end by a portion of a compression plate. Preferably, the retainer ring is attached to the inner surface of the first tube section and the compression ring is mechanically attached to the end of the first tube section. A flange welded to the end of the first tube section and the corresponding flange that is part of the compression ring are suitable for mechanically attaching the compression ring to the first tube section. In the preferred embodiment all retainer rings are welded to their respective tube sections. An annular chamber is defined between the first and second tube sections and between the two packing rings. In the most preferred embodiment, a coupling provides access to the annular chamber. The coupling may be closed under normal operation, and selectively removed when access to the annular chamber is desired. For example, one may take selective, or periodic, measurements to determine the adequacy of the seal of the expansion joint. In another embodiment, one may attach measurement devices to the coupling to take measurements over extended periods of time, such as during operation. Such measuring devices may measure whether fluids, such as exhaust gases, flowing through the joint are escaping through the side of the joint, or may take physical measurements of the fluids within the joint, such as temperature and flow rate.

In the preferred embodiment, another flange is attached to the end of the first tube section that is opposite to the end where the compression plate is attached. Preferably, this flange section is welded to the end of the first tube section. The flange can then be mechanically fastened to a corresponding flange on a remaining section of the fluid conduit.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which:

FIGS. 5A and 5B are two views of the compression ring according to the preferred embodiment of the invention; and FIG. 6 is an end view of the section of the fluid conduit according to the preferred embodiment of the invention shown in FIG. 1.

DETAILED DESCRIPTION OF THE PREFERRED EMBODIMENT

Figure 1:
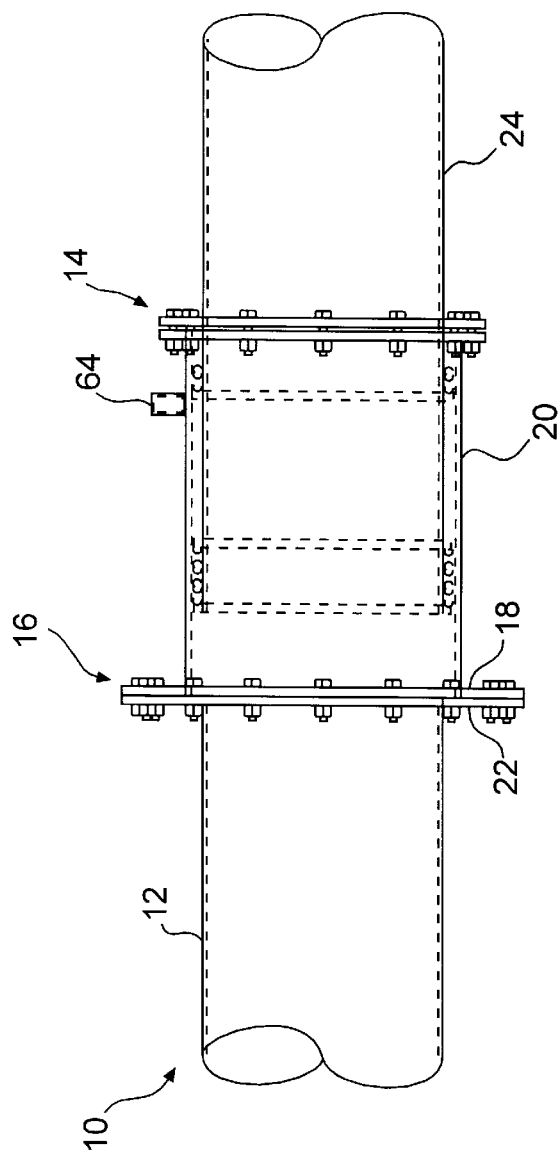
FIG. 1 is a side view of a section of the fluid conduit and the expansion joint according to the preferred embodiment of the invention.

The fluid conduit according to the present invention is designated generally by the reference numeral 10 in FIG. 1. A conduit section 12 is attached to the expansion joint 14 at the attachment region 16. In the preferred embodiment, the attachment region 16 is a first flange 18 welded to a first tube section 20 of the expansion joint 14, and a second flange 22 welded to the conduit section 12. Preferably, the first and second flanges 18 and 22 are attached by mechanical fasteners. A hexagonal head bolt and hexagonal nut with a lock washer is a suitable mechanical fastener.

Figure 2:
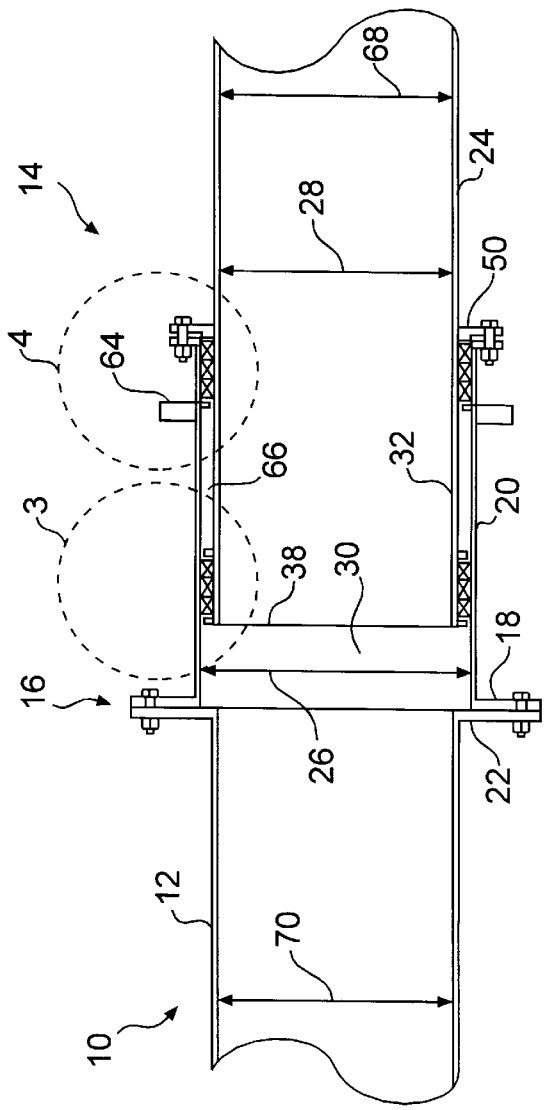
FIG. 2 is a cross-sectional view corresponding to FIG. 1 in which the section is taken in the plane of FIG. 1.

The expansion joint 14 has a first tube section 20 and a second tube section 24. FIG. 2 illustrates a cross-sectional view of the section of the conduit 10 shown in FIG. 1. As one may best view in FIG. 2, the first tube section 20 of the fluid conduit expansion joint 14 has an inner diameter 26 which is greater than the outer diameter 28 of the second tube section 24. The first tube section 20 defines an inner space 30 which accommodates a portion 32 of the second tube section 24.

Figure 3:
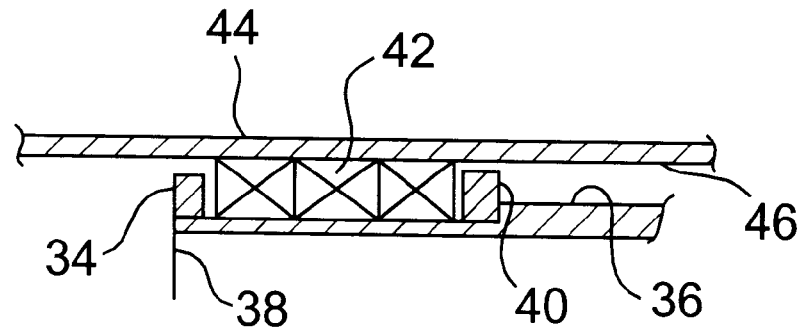
FIG. 3 is an enlarged view of a portion of the view shown in FIG. 2.

FIG. 3 shows an enlarged view of a section 3 of the expansion joint 14, as indicated in FIG. 2. As one may best view in FIG. 3, the expansion joint 14 has a first retainer ring 34 attached to an outer surface 36 of the second tube section 24. In the preferred embodiment, the first retainer ring 34 is fixed to a proximal end 38 of the second tube section 24. A second retainer ring 40 is fixed to the outer surface 36 of the second tube section 24 proximate to the first retainer ring 34, but spaced apart to define an end of a packing gland 42. Suitable materials for the conduit section 12, the first tube section 20, the second tube section 24, and the first and second retaining rings 34 and 40 are stainless steel, brass and/or steel. Preferably, a first retainer ring 34 and a second retainer ring 40 are each welded to the outer surface 36 of the second tube section 24.

Packing material 44 is disposed in the packing gland 42 defined between the first retainer ring 34, the outer surface 36 of the second tube section 24, the second retainer ring 40 and the inner surface 46 of the first tube section 20. Preferably, the packing material 44 is wider than the first retainer ring 34 and the second retainer ring 40 such that it prevents the inner surface 46 of the first tube member 20 from coming into contact with the retainer rings 34 and 40. In the preferred embodiment, the packing material 44 is selected from conventionally known packing materials that can withstand temperatures in a range up to approximately 2300° F. Preferably, there are three rings of packing material 44 disposed in the packing gland 42.

Figure 4:
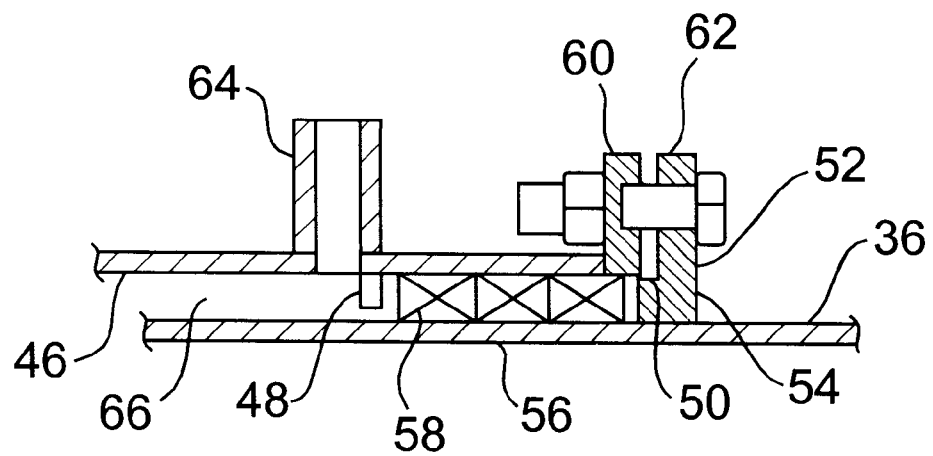
FIG. 4 is an enlarged view of a portion of the expansion joint shown in FIG. 2.

FIG. 4 is an enlarged view of a section 4 of the expansion joint 14, as indicated in FIG. 2. As one may best view in FIG. 4, the expansion joint 14 has a third retainer ring 48 fixed to the inner surface 46 of the first tube section 20. The third retainer ring 48 is fixed to the inner surface 46 of the first tube section 20 proximate to an end 50 of the first tube section 20 which is farthest from the first and second retaining rings 34 and 40.

A compression ring 52 is attached to the end 50 of the first tube section 20. A portion 54 of the compression ring 52 and said third retainer ring 48 define two ends of a second packing gland 56. Packing material 58 is disposed in the second packing gland 56. The second packing gland 56 is defined by the third retainer ring 48, the outer surface 36 of the second tube section 24, the compression ring 52 and the inner surface 46 of the first tube section 20. As with the first packing material 44, the second packing material 58 is preferably thicker than the third retainer ring 48 and the portion 54 of the compression ring 52 such that it prevents the outer surface 36 of the second tube section 24 from coming into contact with the third retainer ring 48 and the portion 54 of the compression ring 52. Preferably, there are three rings of packing material 58 disposed in the packing gland 56. In the preferred embodiment, the packing material 58 is the same or similar material as the packing material 44.

In the preferred embodiment, the first tube section 20 of the expansion joint 14 has a flange 60 attached to the end 50 of the first tube section 20. The compression ring 52 preferably has a flange section 62 which matches the flange 60. In the preferred embodiment, the flange 60 is attached by welding to the end 50 of the first tube section 20. FIGS. 5A and 5B show more detailed views of the compression ring 52. The flange sections 60 and 62 are preferably attached by mechanical fasteners, such as bolts, nuts, and washers.

As one may see in FIGS. 1, 2 and 4, the first tube section 20 has a coupling 64. The coupling 64 provides access to a chamber 66 which has the shape of an annular shell. The chamber 66 is defined by the second retainer ring 40 and packing 38, the second tube section 24, the third retainer ring 48 and packing 58, and the first tube section 20.

Although the preferred embodiment has a coupling 64, the invention is not limited to only embodiments which have a coupling. The coupling 64 may be kept plugged during normal operation, or removed to take measurements to determine whether any fluids in the conduit 10 are leaking. For example, in the case in which the fluid conduit 10 is attached to an exhaust system of an internal combustion engine, one could test for the escape of carbon monoxide gas. In another embodiment, one may attach a permanent testing device to the coupling such as a gauge or gauges, to provide temperature and/or exhaust information.

In the preferred embodiment, the inner diameter 68 of the second tube section 24 is substantially equal to the inner diameter 70 of the conduit section 12. FIG. 6 shows another view of the fluid conduit 10, as illustrated in FIG. 1, but viewed from the direction of the conduit section 12.

In operation, the fluid conduit 10 will typically carry a fluid, such as exhaust gas, which is at a very different temperature from room temperature. The fluid conduit 10 will typically be attached to an engine, such as an internal combustion engine to carry away the exhaust gases. When the expansion joint 14 is assembled, the packing material 44 and the packing material 58 are in a compressed state. Once released, the packing material forms a seal that prevents the fluid, such as exhaust gases, from escaping from the fluid conduit 10. In addition, the packing material 44 and packing material 58 dampen vibrations of the fluid conduit 10 that may be transmitted from the engine. Once the engine is started, exhaust gases will flow through the fluid conduit 10. When the hot gases flow through the fluid conduit 10, in the example of an internal combustion engine, the fluid conduit heats up, and expands due to the rise in temperature. Similarly, when the engine is shut down, the fluid conduit 10 decreases its temperature, thus leading to a contraction of the metal components. As the fluid conduit 10 heats and cools, the first tube section 20 and second tube section 24 slide relative to each other without the metal components coming into contact with each other. In this way, the expansion joint 14 permits the fluid conduit 10 to expand and contract as the fluid conduit 10 changes in temperature, and also provides an expansion joint which can dampen vibrations and reduces fatigue and wear of the joint. The wear and tear of the expansion joint 14 is focused on the packing material. The packing material is readily replaceable once its seal begins to diminish.

After extended use, one may determine, for example, through coupling 64, that the expansion joint 14 no longer provides an adequate seal to prevent fluids from escaping. In that event, the expansion joint 14 can be repacked to re-establish a good seal.

Although the above only describes a single embodiment in detail, those who are skilled in the art will readily appreciate that many modifications of the exemplary embodiment are possible without materially departing from the novel teachings and advantages of this invention.

What is claimed is:

1. A fluid conduit expansion joint, comprising:
  a first tube section having an inner diameter and an outer diameter, said first tube section defining an inner region and an outer region;
  a second tube section having an outer diameter that is smaller than said inner diameter of said first tube section, said second tube section being slidably disposed with a portion in said inner region defined by said first tube section, said second tube section having first and second retainer rings fixed to an outer surface of said second tube section proximate to an end of said portion disposed in said inner region defined by said first tube section, said first and second retainer rings being spaced apart to define two ends of a packing gland, and said first tube section has a third retainer ring attached to an inner surface of said first tube section proximate to the end that is farthest from said first and second retainer rings;
  packing material disposed between and in direct contact with said first tube section and said portion of said second tube section; and
  a packing compression ring attached to said end of said first tube section, said compression ring being slidably disposed over said outer surface of said second tube section, wherein said packing compression ring and said third retainer ring define two ends of a second packing gland,
  wherein said packing material forms a fluid-tight seal between said first and second tube sections, and
  said packing material is a thickness such that it keeps said first and second tube sections spaced apart including during operation of said fluid conduit expansion joint, and said packing material absorbs and dampens vibrations of said fluid conduit expansion joint during operation.

2. A fluid conduit expansion joint according to claim 1, wherein said packing is disposed in said first mentioned and said second packing glands, said packing having a width that is wider than widths of said first, second and third retainer rings, thereby preventing said first and second retainer rings from coming into contact with said first tube section, and preventing said third retainer ring from coming into contact with said second tube section.

3. A fluid conduit expansion joint according to claim 1, wherein said first tube section has a coupling that provides access to a chamber defined by said first and second packing glands and said first and second tube sections.

4. A fluid conduit expansion joint, comprising:
  a first tube section having an inner diameter and an outer diameter, said first tube section defining an inner region and an outer region;
  a second tube section having an outer diameter that is smaller than said inner diameter of said first tube section, said second tube section being slidably disposed with a portion in said inner region defined by said first tube section, said second tube section having first and second retainer rings fixed to an outer surface of said second tube section proximate to an end of said portion disposed in said inner region defined by said first tube section; and
  packing material disposed between and in direct contact with said first tube section and said portion of said second tube section,
  wherein said packing material forms a fluid-tight seal between said first and second tube sections, and
  said first tube section has an attachment region on the end opposed to said end that is farthest from said first and second retainer rings.

5. A fluid conduit expansion joint according to claim 4, wherein said packing material is a thickness such that it keeps said first and second tube sections spaced apart including during operation of said fluid conduit expansion joint, and said packing material absorbs and dampens vibrations of said fluid conduit expansion joint during operation.

6. A fluid conduit expansion joint according to claim 4, wherein said first and second retainer rings are spaced apart to define two ends of a packing gland.

7. A fluid conduit expansion joint according to claim 6, wherein said first tube section has a third retainer ring attached to an inner surface of said first tube section proximate to the end that is farthest from said first and second retainer rings.

8. A fluid conduit, comprising:
  a conduit section; and
  an expansion joint attached to said conduit section as an axial continuation thereof,
  wherein said expansion joint comprises
  a first tube section having an inner diameter and an outer diameter, said first tube section defining an inner region and an outer region;
  a second tube section having an outer diameter that is smaller than said inner diameter of said first tube section said second tube section being slidably disposed with a portion in said inner region defined by said first tube section, said second tube section having first and second retainer rings fixed to an outer surface of said second tube section proximate to an end of said portion disposed in said inner region defined by said first tube section, said first and second retainer rings being spaced apart to define two ends of a packing gland, and said first tube section having a third retainer ring attached to an inner surface of said first tube section proximate to the end that is farthest from said first and second retainer rings;
  packing material disposed between and in direct contact with said first tube section and said portion of said second tube section; and a packing compression ring attached to said end of said first tube section, said compression ring being slidably disposed over said outer surface of said second tube section, wherein said packing compression ring and said third retainer ring define two ends of a second packing gland, wherein said packing material forms a fluid-tight seal between said first and second tube sections, and said packing material is a thickness such that it keeps said first and second tube sections spaced apart including during operation of said fluid conduit expansion joint, and said packing material absorbs and dampens vibrations of said fluid conduit expansion joint during operation.

9. A fluid conduit according to claim 8, wherein said packing is disposed in said first mentioned and said second packing glands, said packing having a width that is wider than widths of said first, second and third retainer rings, thereby preventing said first and second retainer rings from coming into contact with said first tube section, and preventing said third retainer ring from coming into contact with said second tube section..

10. A fluid conduit according to claim 8, wherein said first tube section has a coupling that provides access to a chamber defined by said first and second packing bladders and said first and second tube sections.

11. A fluid conduit, comprising:

a conduit section, and an expansion joint attached to said conduit section as an axial continuation thereof, wherein said expansion joint comprises a first tube section having an inner diameter and an outer diameter, said first tube section defining an inner region and an outer region, a second tube section having an outer diameter that is smaller than said inner diameter of said first tube section, said second tube section being slidably disposed with a portion in said inner region defined by said first tube section, said second tube section having first and second retainer rings fixed to an outer surface of said second tube section proximate to an end of said portion disposed in said inner region defined by said first tube section, and packing material disposed between and in direct contact with said first tube section and said portion of said second tube section, wherein said packing material forms a fluid-tight seal between said first and second tube sections while permitting said first and second tube sections to slide relative to each other in response to longitudinal thermal expansion and contraction of said fluid conduit, and said conduit section is attached to an attachment region on the end of said first tube section that is opposed to said end that is farthest from said first and second retainer rings.

12. A fluid conduit according to claim 11, wherein said packing material is a thickness such that it keeps said first and second tube sections spaced apart including during operation of said fluid conduit expansion joint, and said packing material absorbs and dampens vibrations of said fluid conduit expansion joint during operation.

13. A fluid conduit according to claim 11, wherein said second tube section has first and second retainer rings fixed to an outer surface of said second tube section proximate to an end of said portion disposed in said inner region defined by said first tube section, said first and second retainer rings being spaced apart to define two ends of a packing gland.

14. A fluid conduit according to claim 11, said first tube section has a third retainer ring attached to an inner surface of said first tube section proximate to the end that is farthest from said first and second retainer rings.

15. A fluid conduit according to claim 11 wherein an inner diameter of said conduit section is substantially equal to an inner diameter of said second tube section.

* * * * *